United States Patent
Glickman et al.

(10) Patent No.: US 7,758,106 B2
(45) Date of Patent: Jul. 20, 2010

(54) SELF-ADJUSTING AUTOMOTIVE RADIATOR GRILLE SUPPORT

(75) Inventors: David B. Glickman, Southfield, MI (US); Joseph A. Hickey, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 79 days.

(21) Appl. No.: 12/025,023

(22) Filed: Feb. 2, 2008

(65) Prior Publication Data

US 2009/0195028 A1    Aug. 6, 2009

(51) Int. Cl.
B60R 19/52    (2006.01)
B62D 27/04    (2006.01)

(52) U.S. Cl. ............... 296/193.1; 296/1.03; 180/69.23; 293/115

(58) Field of Classification Search ............. 296/193.1, 296/193.11, 1.03, 1.04, 1.07; 180/69.23, 180/69.22, 68.6; 16/86 R, 86 A; 267/140.12–140.13, 267/140.5, 141.1, 141.2, 141.6; 293/115
See application file for complete search history.

(56) References Cited

U.S. PATENT DOCUMENTS

| | | | | |
|---|---|---|---|---|
| 1,626,955 A | * | 5/1927 | Newton | 16/86 A |
| 2,037,033 A | * | 4/1936 | Lord | 267/141.6 |
| 3,824,649 A | * | 7/1974 | Kempf | 16/86 A |
| 5,125,704 A | * | 6/1992 | Perechodnik | 293/115 |
| 5,478,127 A | | 12/1995 | Chase | 293/115 |
| 5,735,511 A | * | 4/1998 | Stocker et al. | 267/140.13 |
| 6,039,388 A | * | 3/2000 | Choi | 296/207 |
| 6,923,496 B1 | | 8/2005 | Pleet | 296/193.11 |
| 2005/0167998 A1 | * | 8/2005 | Pleet et al. | 293/115 |
| 2006/0237998 A1 | * | 10/2006 | Andre et al. | 296/193.11 |
| 2009/0115116 A1 | * | 5/2009 | Siemer et al. | 267/140.12 |

* cited by examiner

*Primary Examiner*—Patricia L Engle
(74) *Attorney, Agent, or Firm*—Greg Brown, Esq.; Miller Law Group, PLLC

(57) ABSTRACT

A support for an automotive radiator grille that is supported from the hood assembly of the vehicle is formed of two major components, a support bracket and a rubber stop retained on the support bracket for engagement with the radiator grille when the hood is moved into the lowered, closed position. The rubber stop is formed in a circular configuration with a central projecting bumper that deflects into a cup formed by the support bracket to maintain contact with the radiator grille and provide self-adjusting positioning to accommodate build tolerances and variations in the hood assembly and mounted radiator grille. The rubber stop can be formed of multi-durometer elastomers to provide a tuning to the specific application for the radiator grille support. The rubber stop places a pre-load on the hood latch and closure mechanism through the spring-like deflection of the rubber stop into the cup.

13 Claims, 6 Drawing Sheets

SELF-ADJUSTING AUTOMOTIVE RADIATOR GRILLE SUPPORT

FIELD OF THE INVENTION

This invention relates generally to the radiator grilles for automobiles and, more particularly, to a self-adjusting elastomeric support for a grille mounted on the hood assembly when the hood is placed into a lowered closed position.

BACKGROUND OF THE INVENTION

Automotive radiator grilles allow the passage of air through the forward portion of the automobile to the radiator which is supported on the body of the automobile immediately behind the grille. The radiator grille can be mounted on the body of the vehicle, and thus is relatively fixed in position, or mounted on the hood assembly, and thus is movable relative to the radiator when the hood is raised. Typically, the hood is pivotally attached to the vehicle body at a rearward edge of the hood at a location near the windshield of the vehicle. Thus, the raising of the hood panel to reach the engine and related components beneath the hood results in the radiator grille also being raised relative to the radiator. Lowering the hood panel is often accomplished with a substantial force being applied to secure the hood panel latch mechanism. This application of force to close the hood panel is also transmitted to the radiator grille.

The hallmark of a typical vehicle has been symbolized more by its grille design than any other singular design element. As such, grilles are held to high standards of fit and durability. When the radiator grille is mounted to the hood panel of an automotive vehicle, the radiator grille is particularly subject to concerns relating to fit and durability. The mounting of the radiator grill to the hood panel raises a number of issues that affect the fit and durability of the radiator grille. The radiator grille is not secured to the body in its intended position, i.e. with the hood lowered into a closed position, but rather as an attached component to the hood assembly. The position of the radiator grille is far from the components, i.e. the hinge, that secure the hood assembly to the body of the vehicle, especially when the hood assembly pivots from a location near the windshield area. The force used to close the hood assembly requires that the radiator grille have larger clearances to surrounding components, although this clearance requirement can be minimized through the use of additional parts to counteract forces both from hood closing and movement during vehicle operation.

The forces resulting from the radiator grille being attached to a relatively massive hood panel cause additional stresses on the radiator grille which are much more difficult to control. The additional forces on the radiator grille from the hood latch and the hood itself, cause additional stresses on the radiator grille which are manifested in fit and durability issues that a traditional body-mounted and fixed-position radiator grille does not have. The build tolerances caused by a chain of additional parts, e.g., hood panels, hinges and pivots; cowl; fenders, etc., cause higher build and fit tolerances and unit variation in the final "hood closed" position of the radiator grille compared to its surrounding components. During vehicle operation, the radiator grille will move with the hood, independent of the surrounding components, such as headlamps, fascia, radiator support, etc. The radiator grille will also undulate at speed, commonly referred to as "grille flutter", or as a result of closing the hood, inducing the radiator grille to move independently from other fixed front end components.

Traditional approaches to solving the above fit and durability issues for a hood-mounted radiator grille have utilized hard plastic or rubber components, sometimes interfacing with metal or other body parts, which have to be individually fit and/or manually adjusted, or are simply non-adjustable. Such conventional solutions are many times operator-dependent, expensive, and do not fully address the problem of introducing unintended stresses in, and/or causing poor fit of, the radiator grille. Furthermore, these conventional approaches to resolve the fit and durability of the radiator grille often result in squeaks, rattles, premature wear, and other issues with the radiator grille and even in the added parts because of the necessary contact and high stresses in such a system. As a result, these conventional "solutions" are often no better than the problem itself.

One known conventional device is used on the current Ford F-150 pick-up truck uses a fix metal brace with an integral rubber stop, which is not adjustable. This conventional device is represented in U.S. Pat. No. 6,923,496, granted to Edward Pleet, et al. on Aug. 2, 2005, wherein a bracket including a pad material is attached to a motor vehicle frame to reduce the vibrations of a hood-mounted grille resulting from road forces or from slamming the hood shut. This anti-flutter bumper includes a bracket with a resilient pad, which may be made of rubber, plastic, nylon, a spring, or any other vibration-absorbing material. When the hood is closed, the anti-flutter bumper forms an interference fit with the inward-facing lower edge of the grille via the resilient pad, thus supporting the radiator grille in position.

In U.S. Pat. No. 5,478,127, issued on Dec. 26, 1995, discloses a support system that allows the lower edge of a hood-mounted radiator grille to resiliently flex along with the bumper, thus absorbing impacts during low-speed collisions. This system possesses sufficient rigidity to make the radiator grille relatively unsusceptible to road and aerodynamically induced vibrations. The radiator grille is attached by the upper edge thereof to the hood such that the lower edge of the radiator grille is suspended over the bumper. The upper grille flange extends from the upper support member and attaches to the hood through the return flange, permitting the radiator grille to rotationally flex relative to the hood during impact. The lower support member of the grille is also attached to the hood through the resilient support member, providing rigidity and vibration-dampening capability to the entire grille support system, thus reducing grille flutter. Screw-adjustable rubber stops can be utilized to achieve manual adjustment for the radiator grille support, but such devices have to be adjusted for each unit to account for build and part tolerances and variation specific to each unit built.

None of the known prior art devices provide a self-adjusting support for a hood-mounted radiator grille. Accordingly, it would be desirable to provide a radiator support that would be capable of self-adjustment in any of three independent directions to accommodate build tolerances and provide an anti-flutter support for a hood-mounted radiator grille.

SUMMARY OF THE INVENTION

It is an object of this invention to overcome the aforementioned disadvantages of the known prior art by providing a radiator grille for deployment on the forward end of an automotive vehicle to provide the operative function of directing the flow of air onto the radiator, while providing a self-adjusting support for the grille.

It is another object of this invention to provide a self-adjusting support for a hood-mounted radiator grille.

It is an advantage of this invention that self-adjusting radiator grille support can be utilized to accommodate build tolerances and variations without requiring individual adjustment for each unit manufactured.

It is a feature of this invention that the radiator grille support will automatically adjust for flushness.

It is another feature of this invention that the radiator grille support will automatically adjust for up/down and side-to-side build variations.

It is still another feature of this invention that the radiator grille support will maintain contact with the radiator grille during vehicle operation.

It is another advantage of this invention that the continued contact between the radiator grille support and the radiator grille will not result in wear between the mating components, which can cause rattles and squeaks during the operation of the vehicle.

It is still another feature of this invention that the radiator grille can be manufactured out of mono-, dual- or multi-durometer elastomers of various types.

It is still another advantage of this invention that the construction of the radiator grille support can be tuned through the use of different durometer elastomers for specific applications.

It is yet another feature of this invention that the radiator grille support can be utilized in other closure systems in applications other than the support of radiator grilles.

It is yet another feature of this invention that the radiator grille support can be manufactured in a cost-effective manner and provide an efficient package for automotive assemblies.

It is a further feature of this invention that the radiator grille support adds a pre-load to the latch and closure mechanism of the vehicle hood assembly.

It is yet another advantage of this invention that the radiator grille support will resist grille fluttering vibrations induced into the radiator grille during vehicle operation.

It is a further object of this invention to provide a radiator grille support for a hood-mounted automotive radiator grille that is durable in construction, inexpensive of manufacture, carefree of maintenance, facile in assemblage, and simple and effective in use.

These and other objects, features and advantages are accomplished according to the instant invention by providing a support for an automotive radiator grille that is supported from the hood assembly of the vehicle. The support is formed of two major components, a support bracket and a rubber stop retained on the support bracket for engagement with the radiator grille when the hood is moved into the lowered, closed position. The rubber stop is formed in a circular configuration with a central projecting bumper that deflects into a cup formed by the support bracket to maintain contact with the radiator grille and provide self-adjusting positioning to accommodate build tolerances and variations in the hood assembly and mounted radiator grille. The rubber stop can be formed of multi-durometer elastomers to provide a tuning to the specific application for the radiator grille support. The rubber stop places a pre-load on the hood latch and closure mechanism through the spring-like deflection of the rubber stop into the cup.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
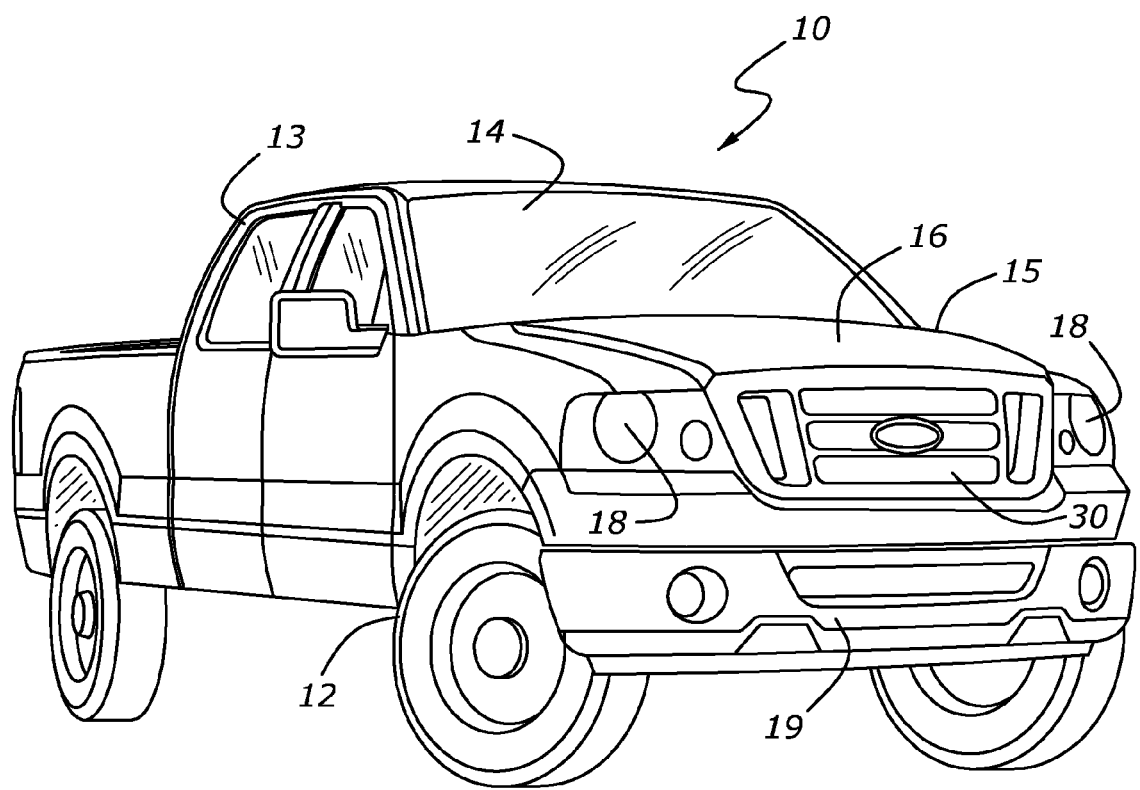
FIG. 1 is a perspective view of an automotive vehicle having a hood assembly that includes a hood-mounted radiator grille.
Figure 2:
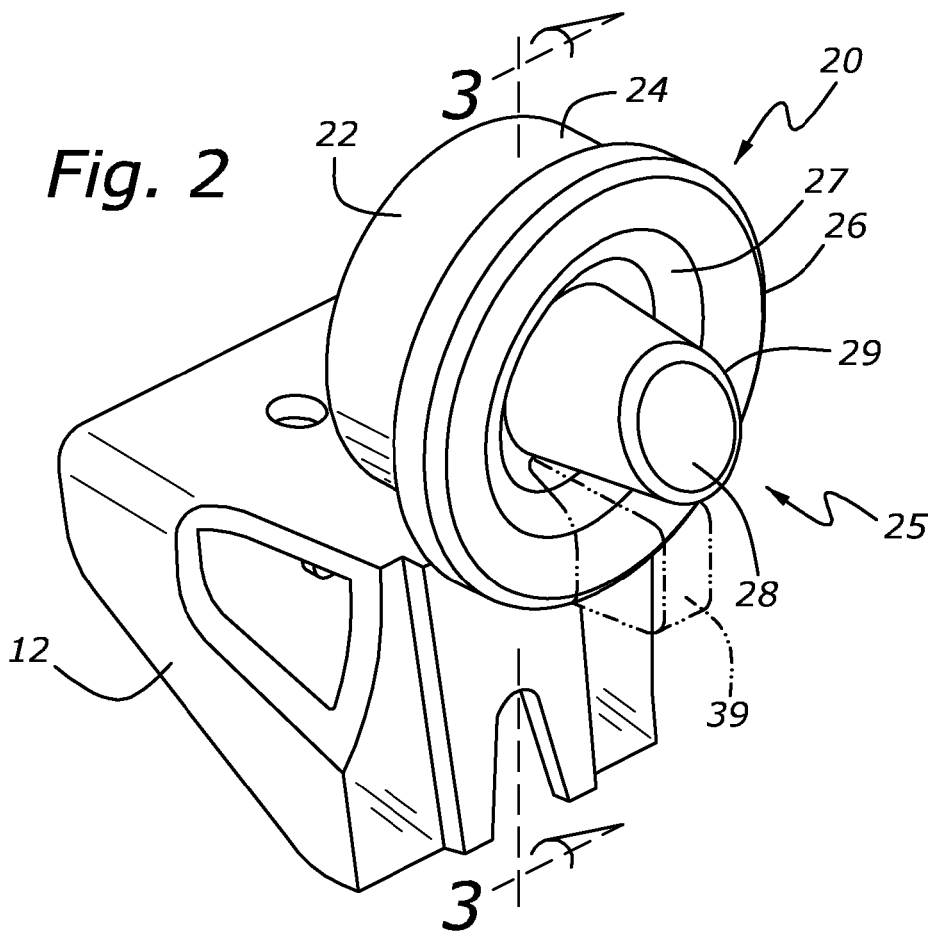
FIG. 2 is a perspective view of a radiator grille support incorporating the principles of the instant invention and being mounted on the body of the automotive vehicle shown in FIG. 1 for engagement with the radiator grille when moved into the closed position as shown in FIG. 1, an optional rubber foot located beneath the central rubber bumper being depicted in phantom.
Figure 3:
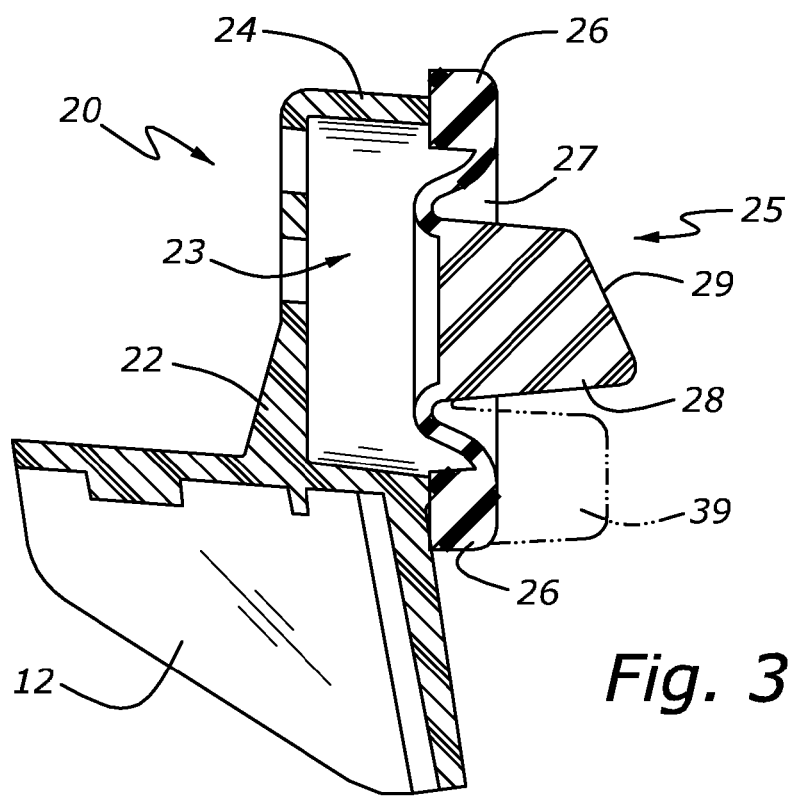
FIG. 3 is a cross-sectional view of the radiator grille support corresponding to lines 3-3 in FIG. 2, the optional foot beneath the central rubber bumper being shown in phantom.

Referring to FIGS. 1-6, an automotive vehicle in the form of a pick-up truck having a hood-mounted radiator grille and a support therefor incorporating the principles of the instant invention can best be seen. The automotive vehicle is shown in the form of a pick-up truck 10 having a conventional wheeled frame 12 forming supporting the body of the vehicle. A passenger compartment 13 is supported on the body 12 to provide an enclosure for the comfort of the operator and passengers being carried by the vehicle 10. The forward portion of the passenger compartment terminates in a windshield 14 through which the operator can see to operate and drive the vehicle 10. A hood assembly 15 is located forwardly of the windshield 14 and includes a hood panel 16 that covers the engine compartment. The hood assembly 15 also includes a radiator grille 30 that is mounted at the forward end of the hood panel 16 and extends generally vertically therefrom to present a generally vertically face between the headlights 18 and above the front bumper 19. The hood assembly 15 is hinged for movement at a rearward edge thereof adjacent the windshield 14 such that the hood panel 16 and the attached radiator grille 30 can move from the lowered, closed position depicted in FIG. 1 to a pivotally raised open position (not shown) that permits access into the engine compartment in a conventional manner.

Referring now to FIGS. 2-6, the radiator grille support 20 incorporating the principles of the instant invention can best be seen. The radiator grille support 20 is mounted at a forward position on the body 12 of the vehicle 10 to engage the radiator grille 30 when lowered into the closed position depicted in FIG. 1. The radiator grille support 20 has two major components, a plastic or metal bracket 22 and an elastomeric stop 25. The bracket is mounted on the body 12 and defines a receiving cup 23 having a mounting flange 24 extending around the perimeter thereof. The elastomeric stop 25 has a circular rim 26 mounted on the mounting flange 24 and surrounding a central bowl 27 that is depressed into the cup 23. Projecting outwardly from the center of the central bowl 27 is a cylindrical rubber bumper 28 that terminates in a forward engagement surface 29. As can be seen best in FIGS. 2 and 3, the central rubber bumper 28 extends forwardly of the mounting rim 26 to engage the radiator grille 30, as will be described in greater detail below.

Figure 7:
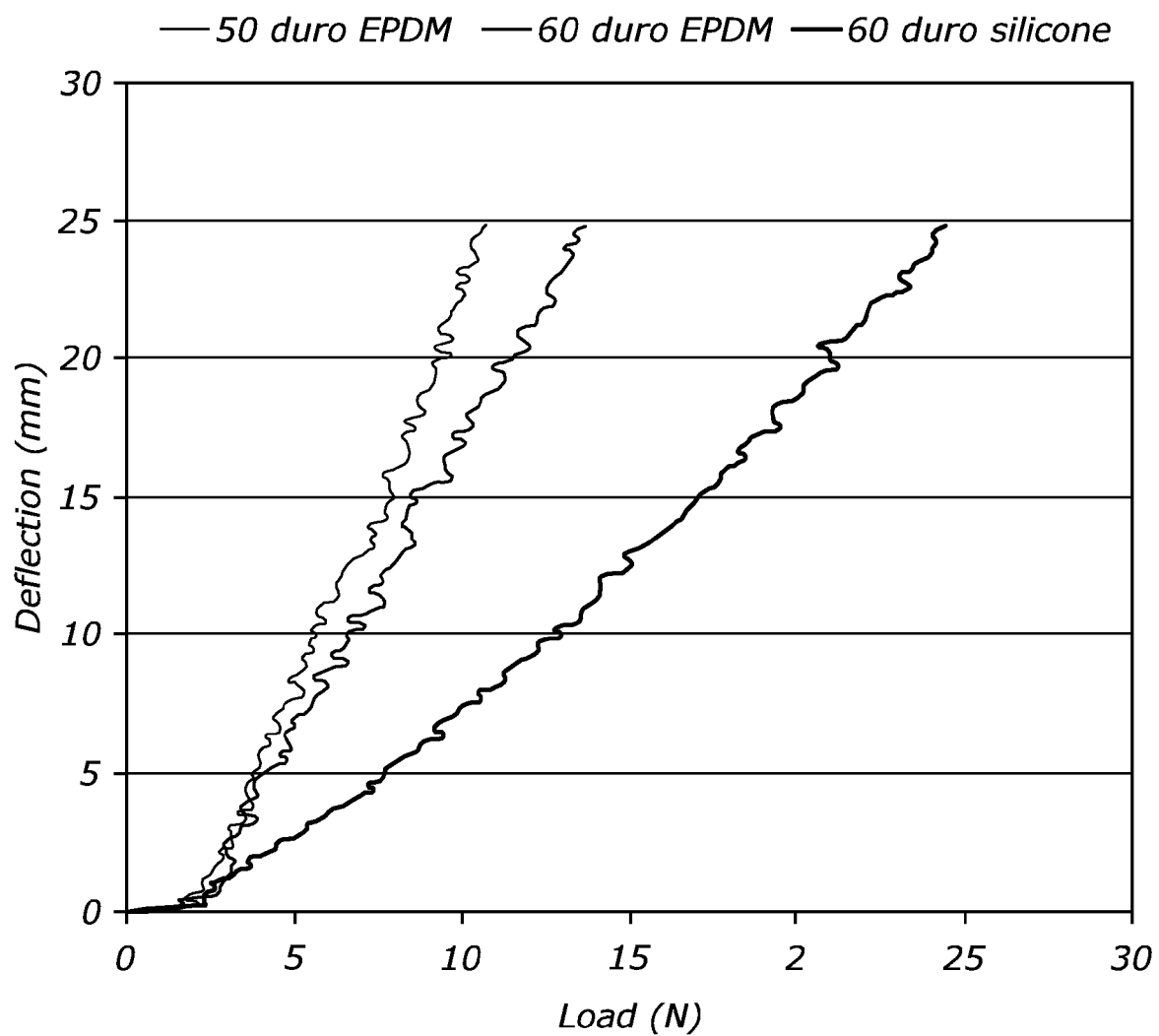
FIG. 7 is a graph depicting the deflection of different durometer elastomers in response to applied loads for the radiator grille support.

The elastomeric stop 25 can be formed from mono-durometer, dual-durometer, or multi-durometer elastomers of various types to provide the specific performance desired for the support 20. For example, the elastomeric stop 25 can be formed from santoprene, ethylene propylene diene monomer rubber (EPDM) or silicone. Referring to the graph depicted in FIG. 7, one skilled in the art will note the deflection for a given load when 50 duro EPDM, 60 duro EPDM and 60 duro silicone are used to construct the elastomeric stop 25. In the way of an example, the rubber bumper 28 can be made of 60 duro silicone to limit the deflection of the bumper 28 when engaged by the radiator grille 30, while the central bowl 27 could be made from 60 duro EDPM to allow the deflection of the central bowl 27 into the cup 23 when loaded from the engagement therewith by the radiator grille 30.

Figure 4:
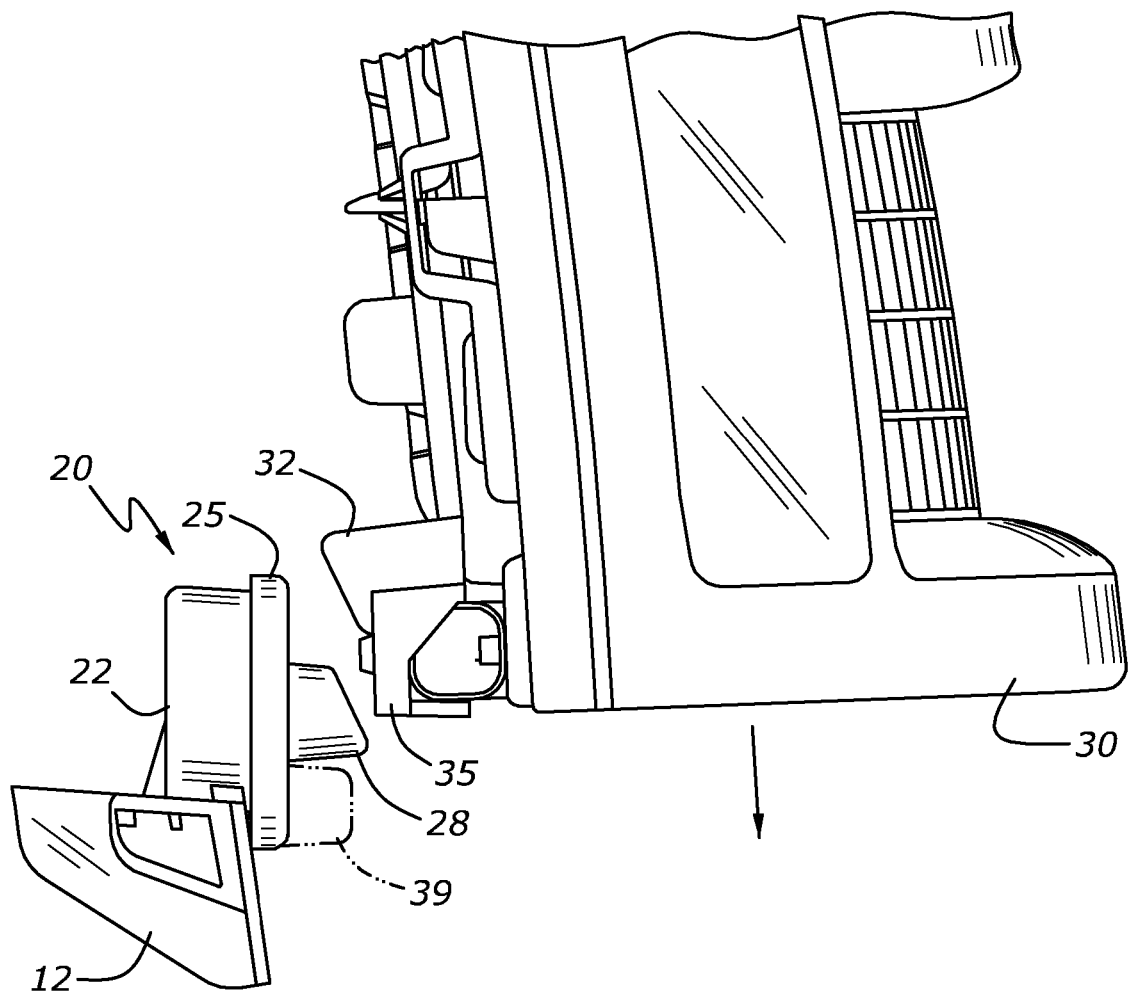
FIG. 4 is a side elevational view of a hood-mounted radiator grille moving into engagement with the radiator grille support incorporating the principles of the instant invention, the optional rubber foot located under the central rubber bumper being shown in phantom.
Figure 5:
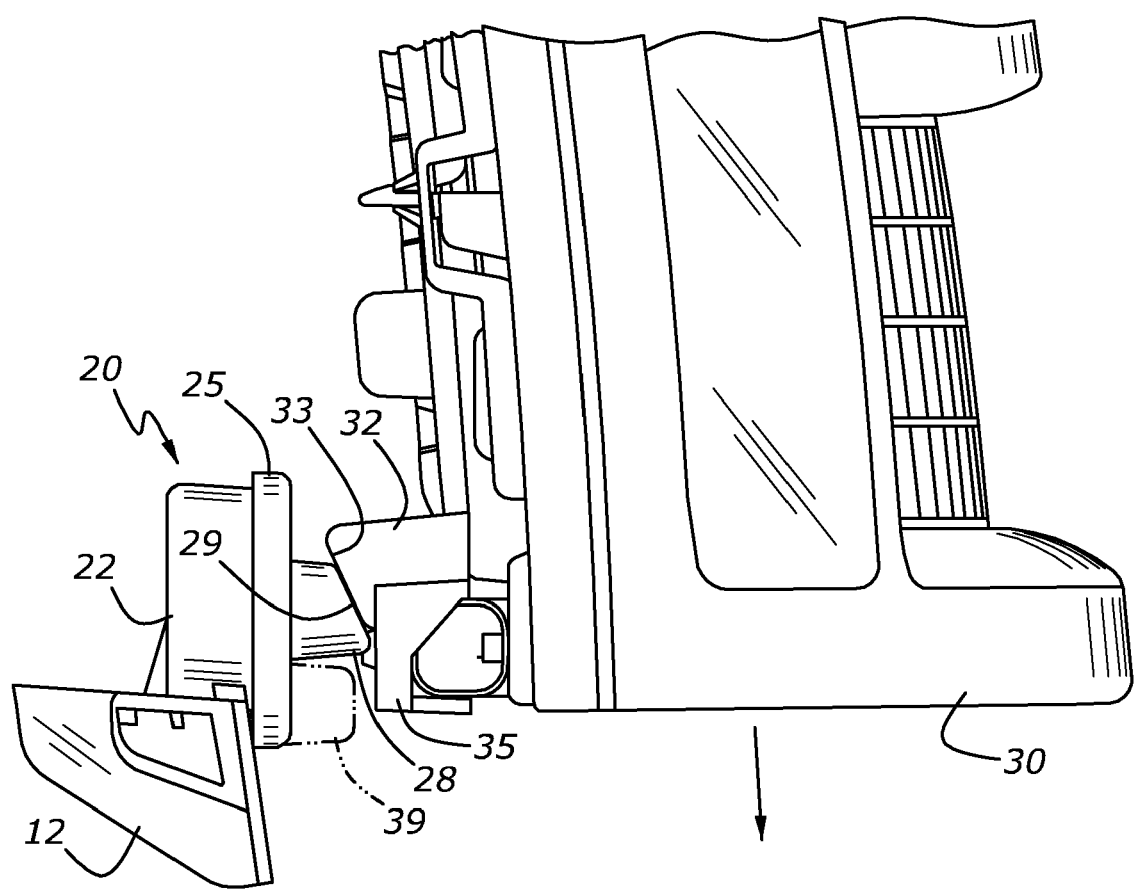
FIG. 5 is a side elevational view of the hood-mounted radiator grille and support similar to that shown in FIG. 4, except that the radiator grille has moved into initial engagement with the central rubber stop of the radiator grille support.

In practice, the hood assembly 15 is lowered to the closed position, which places the lower edge of the radiator grille 30 into engagement with the elastomeric stop 25. As seen in FIG. 4, the radiator grille 30 is preferably formed with a rubber stop 32 that has an engagement surface 33 that mates to the upwardly sloped engagement surface 29 on the rubber bumper 28. While this rubber stop 32 on the radiator grille 30 is not necessary, the stop 32 is preferred as providing a mating structure that will engage the rubber bumper 28. Alternatively, some other rearwardly protruding structure will be engageable with the rubber bumper 28 when the hood assembly 15 lowers into the closed position. As seen in FIG. 5, the rubber stop 32 is lowered into a mating engagement with the rubber stop 28. Even if the rubber stop 32 is slightly out of alignment with the rubber bumper 28, the projection of the rubber bumper 28 from the center of the depressed bowl 27 will allow a corresponding deflection of the rubber bumper 28 to accommodate the misalignment, whether the misalignment is up/down or side-to-side. The depth of the deflection of the rubber bumper 28 into the bracket cup 23 will also accommodate any variations in the alignment of the radiator grille 30 in a fore-and-aft direction.

Figure 6:
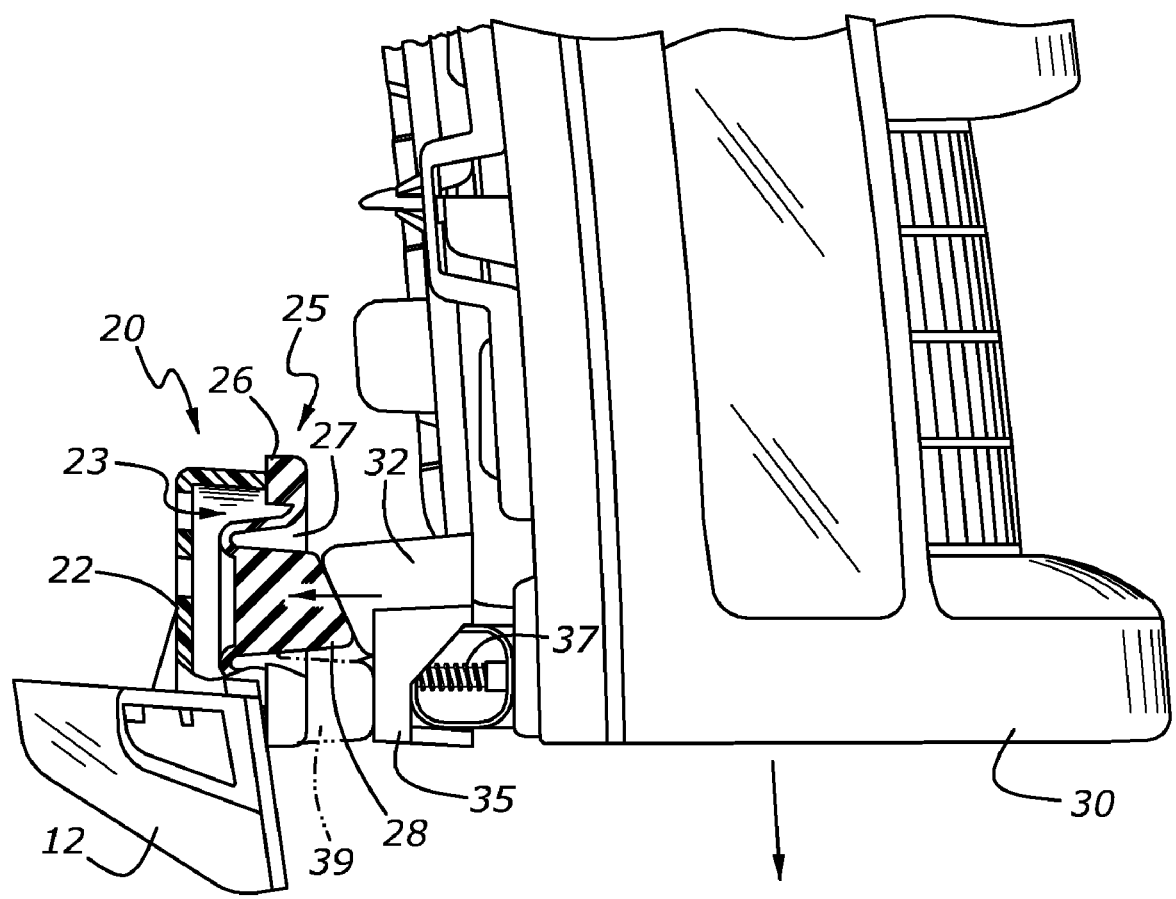
FIG. 6 is a side elevational view of the radiator grille and support similar to that of FIGS. 4 and 5 but with the radiator grille moving into a fully engaged position forcing the central rubber bumper into the bracket cup, portions of the radiator grille support being broken away in cross-section to better view the positioning of the central rubber bumper.

The elastomeric stop 25 can also be formed with an optional foot 39 which can be formed into the mounting rim 26 below the rubber bumper 28 and extending inwardly into the rubber bumper 28. As can be see in comparison with FIGS. 5 and 6, the rubber stop 32 causes the deflection of the rubber bumper 28 into the bracket cup 23 stretching the central bowl 27 as the radiator grille is lowered into the closed position. The optional foot 39 having a larger structure than the surrounding central bowl 27 will not deflect as readily into the cup 23 and, as the rubber bumper 28 deflects into the cup 23, the optional foot 39 will engage a lower frame structure 35 of the radiator grille 30 to provide additional support for the radiator grille 30 when in the closed position. As is depicted in FIG. 6, the lower frame structure 35 can be positionally adjustable in a fore-and-aft direction by a threaded adjustment bolt 37 to provide the desired engagement and support from the optional foot 39.

The elastomeric stop 25 can absorb variations in build in all three (high-low, side-to-side, up-down) basic directions, and also places an equalizing force against the rubber stop 32 on the radiator grille 30 to allow for the desired build position of the grille 30 after the hood assembly 15 is closed. The durability characteristics of the elastomer ensure reliability and durability during the life of the vehicle and its own ability to respond in a spring-like fashion is exploited to create the ability of the elastomeric stop 20 to "self-adjust" and achieve the desired position of the central rubber bumper 28. Use of mating rubber stops 32 in the interface between the proposed support and the grille can also enhance noise, vibration, harshness, and durability performance of the contacted parts.

The deflected elastomeric stop 25, due to the stretched central bowl 27, will assert a spring-like load onto the radiator grille 30 to urge the radiator grille 30 in a forward direction opposite to the direction of the deflection of the rubber bumper 28. This loading will serve as a pre-load on the latch or closure mechanism (not shown) of the hood assembly 15. This elastomeric support 20 can also be used on other closures systems on the vehicle to provide a desired support of the component being closed, and a spring-like load asserted by the support 20 on the closed component.

The depressed central elastomeric bowl 27 allows the rubber bumper 29 to deflect as needed to adjust to the positioning of the rubber stop 32 closing against the elastomeric stop 25, thus providing a self-adjusting support 20 for the engagement of the radiator grille 30. With at least two, and preferably several depending on the lateral width of the radiator grille 30, of the supports 20 spaced along the body 12 for engagement with the radiator grille 30, the radiator grille 30 will be supported against the body 12 against fluttering and without asserting undue stresses on the radiator grille 30 from the closure of the hood assembly 15.

It will be understood that changes in the details, materials, steps, processes and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

For example, although the bracket cup 23 is depicted in the drawings as being circular, which is the preferred embodiment due to the circular configuration being an efficient package that provides generally equal positional variation is all directions, one skilled in the art will recognize that other cup configurations with a mating elastomeric stop 25 could be equally effective in other applications. If the design required an accommodation of twice as much side-to-side variation as up and down variation, the cup 23 could be rectangularly shaped to provide the required variation capability.

Having thus described the invention, what is claimed is:

1. In an automotive vehicle having body supporting a hood assembly for movement in a generally vertical direction between a raised opened position and a lowered closed position, and a radiator grille supported on said hood assembly for movement therewith, the improvement comprising:

a radiator grille support member mounted on said body for engagement with said radiator grille when lowered into said closed position, said radiator grille support member including:

a rigid bracket attached to said body and defining a cup having a rigid mounting flange extending around the periphery thereof; and an elastomeric stop mounted on said bracket for deflection into said cup when engaged by said radiator grille, said elastomeric stop including:
a mounting rim engaged with said mounting flange to support said elastomeric stop on said bracket;
a central elastomeric bowl extending inwardly from said mounting rim; and
an elastomeric bumper located at the center of said elastomeric bowl and projecting outwardly thereof projecting beyond said mounting rim and said central elastomeric bowl for engagement with said radiator grille, said elastomeric bumper terminating in an engagement surface sloped upwardly for engagement with said radiator grille.

2. The automotive vehicle of claim 1 wherein said central elastomeric bowl deflects into said cup when said elastomeric bumper is engaged by said radiator grille moving into said closed position.

3. The automotive vehicle of claim 2 wherein said elastomeric bowl is formed from a different elastomer than said elastomeric bumper.

4. The automotive vehicle of claim 3 wherein said radiator grille is provided with a rubber stop that engages said elastomeric stop when the hood assembly is lowered into said closed position.

5. The automotive vehicle of claim 4 wherein said radiator grille support member further comprises an elastomeric foot formed into said central elastomeric bowl below said elastomeric bumper to provide support for a lower frame structure of said radiator grille when lowered into said closed position.

6. The automotive vehicle of claim 4 wherein said elastomeric bumper is formed as a cylindrical member.

7. A radiator grille support member affixed to a body of an automotive vehicle to engage a hood-mounted radiator grille, including a rearwardly protruding member, when lowered to a closed position, comprising:
a rigid bracket attached to said body and defining a cup having a rigid mounting flange extending around the periphery thereof;
an elastomeric stop mounted on said bracket for deflection into said cup when engaged by said radiator grille, said elastomeric stop including a mounting rim engaged with said mounting flange to support said elastomeric stop on said bracket, a central elastomeric bowl extending inwardly from said mounting rim, and a centrally located elastomeric bumper projecting outwardly from the center of said elastomeric bowl, said elastomeric bumper terminating in an engagement surface sloping upwardly for engagement with said rearwardly protruding member so as to deflect into said cup when engaged with said radiator grille, said elastomeric bowl stretching to allow a positioning adjustment of said elastomeric bumper into alignment with said rearwardly protruding member of said radiator grille.

8. The radiator grille support member of claim 7 wherein said elastomeric bowl is formed from a different elastomer than said elastomeric bumper.

9. The radiator grille support member of claim 7 wherein said rearwardly protruding member is a rubber stop that engages said elastomeric bumper when said radiator grille is lowered into said closed position.

10. The radiator grille support member of claim 7 further comprising an elastomeric foot formed into said central elastomeric bowl below said elastomeric bumper to provide support for a lower frame structure of said radiator grille when lowered into said closed position.

11. An automotive vehicle comprising:
a body including a passenger compartment having a windshield;
a hood assembly mounted on said body for pivotal movement about a hinge assembly supported on said body adjacent said windshield, said hood assembly including a hood panel connected to said hinge axis such that said hood panel is movable in a generally vertical direction between a raised opened position and a lowered closed position;
a radiator grille supported on said hood panel for movement therewith relative to said body between said opened position and said closed position; and
a radiator grille support member mounted on said body for engagement with said radiator grille when lowered into said closed position, said radiator grille support member including:
a rigid bracket attached to said body and defining a cup having a rigid mounting flange extending around the periphery thereof;
an elastomeric stop mounted on said bracket for deflection into said cup when engaged by said radiator grille and having a mounting rim engaged with said mounting flange to support said elastomeric stop on said bracket, a central elastomeric bowl extending inwardly from said mounting rim, and an elastomeric bumper located at the center of said elastomeric bowl and projecting outwardly thereof for engagement with said radiator grille, said elastomeric stop deflecting into said rigid cup when engaged with said radiator grille; and
an elastomeric foot formed into said central elastomeric bowl below said elastomeric bumper to provide support for a lower frame structure of said radiator grille when lowered into said closed position.

12. The automotive vehicle of claim 11 wherein said central elastomeric bowl and said elastomeric bumper deflecting into said cup when said rearwardly protruding member engages said elastomeric bumper, said elastomeric bowl stretching to allow a positioning adjustment of said elastomeric bumper into alignment with said radiator grille.

13. The automotive vehicle of claim 12 wherein said elastomeric bowl is formed from a different elastomeric material than said elastomeric bumper.

* * * * *